(12) United States Patent
Kawakami et al.

(10) Patent No.: US 11,560,215 B2
(45) Date of Patent: Jan. 24, 2023

(54) AIRCRAFT, FLIGHT SYSTEM, AND STRUCTURE INSPECTION SYSTEM

(71) Applicant: Ricoh Company, Ltd., Tokyo (JP)

(72) Inventors: Akihiro Kawakami, Tokyo (JP); Shinji Tezuka, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 183 days.

(21) Appl. No.: 16/770,880

(22) PCT Filed: Jan. 24, 2019

(86) PCT No.: PCT/JP2019/002298
§ 371 (c)(1),
(2) Date: Jun. 8, 2020

(87) PCT Pub. No.: WO2019/151112
PCT Pub. Date: Aug. 8, 2019

(65) Prior Publication Data
US 2021/0163122 A1 Jun. 3, 2021

(30) Foreign Application Priority Data

Feb. 5, 2018 (JP) .............................. JP2018-018575
Dec. 17, 2018 (JP) .............................. JP2018-235437

(51) Int. Cl.
*B64C 17/00* (2006.01)
*B64C 27/20* (2006.01)
(Continued)

(52) U.S. Cl.
CPC .............. *B64C 17/00* (2013.01); *B64C 27/20* (2013.01); *B64C 39/024* (2013.01); *B64D 47/08* (2013.01);
(Continued)

(58) Field of Classification Search
CPC .... B64C 27/20; B64C 2201/027; B64C 17/00
See application file for complete search history.

(56) References Cited

U.S. PATENT DOCUMENTS 11,325,696 B2 * 5/2022 Suzuki .................... B64C 27/52
2014/0131507 A1 * 5/2014 Kalantari ................. B60F 5/02
244/2
(Continued)

FOREIGN PATENT DOCUMENTS

| CN | 102785775 A | 11/2012 |
|----|-------------|---------|
| CN | 203227299 U | 10/2013 |

(Continued)

OTHER PUBLICATIONS

International Search Report and Written Opinion dated Apr. 2, 2019 in PCT/JP2019/002298 filed on Jan. 24, 2019.
(Continued)

*Primary Examiner* — Richard G Davis
(74) *Attorney, Agent, or Firm* — Xsensus LLP

(57) ABSTRACT

An aircraft (100) includes a body (10) and an outer frame (1) rotatably coupled to the body (10). The body (10) includes a plurality of rotary blades (15a-15d) and a driver (14a-14d) configured to rotate the plurality of rotary blades (15a-15d). The outer frame (1) includes a rotary frame (1a-1c) rotatable about a rotation axis intersecting the direction of gravity, and a center of gravity of the plurality of rotary blades (15a-15d) and the driver (14a-14d) is located lower than the rotation axis in the direction of gravity.

16 Claims, 16 Drawing Sheets

(51) Int. Cl.
  *B64C 39/02*   (2006.01)
  *B64D 47/08*   (2006.01)

(52) U.S. Cl.
  CPC .. *B64C 2201/027* (2013.01); *B64C 2201/108* (2013.01); *B64C 2201/127* (2013.01); *B64C 2201/141* (2013.01)

(56) References Cited

U.S. PATENT DOCUMENTS

| | | | | |
|---|---|---|---|---|
| 2014/0138477 | A1* | 5/2014 | Keennon | B64C 39/028 244/17.23 |
| 2015/0191246 | A1 | 7/2015 | Kalantari et al. | |
| 2016/0001875 | A1* | 1/2016 | Daler | B64C 17/00 244/17.11 |
| 2017/0166326 | A1* | 6/2017 | Apkarian | B64D 47/08 |
| 2017/0291697 | A1 | 10/2017 | Kornatowski et al. | |
| 2018/0002035 | A1* | 1/2018 | Neely | B64C 39/024 |
| 2021/0061463 | A1* | 3/2021 | Briod | B60L 50/60 |

FOREIGN PATENT DOCUMENTS

| | | |
|---|---|---|
| CN | 104590562 B | 11/2016 |
| CN | 107310720 A | 11/2017 |
| JP | 2016-168861 A | 9/2016 |
| JP | 2017-193321 A | 10/2017 |
| WO | WO 2014/198774 A1 | 12/2014 |
| WO | 2015/049798 A1 | 4/2015 |
| WO | WO 2017/042354 A1 | 3/2017 |

OTHER PUBLICATIONS

Chinese communication dated Nov. 24, 2022 in corresponding Chinese Patent Application No. CN201980007682.X.

* cited by examiner

AIRCRAFT, FLIGHT SYSTEM, AND STRUCTURE INSPECTION SYSTEM

TECHNICAL FIELD

The present disclosure relates to an aircraft, a flight system, and a structure inspection system.

BACKGROUND ART

Certain road-related public infrastructure, such as tunnels and bridges, were built during the period of high economic growth and are now aging. Such road-related public infrastructure requires appropriate maintenance and periodic inspection for continued safe use thereof. To facilitate inspection of less accessible structures, such as high places and confined areas (e.g., side faces and back faces of bridges), there are methods for remotely piloting an unmanned aircraft (drone) equipped with a camera and inspecting the structure using an image acquired with the camera.

However, if a rotary blade of such a remotely piloted aircraft contacts an external object (an obstacle) and the remotely piloted aircraft collides with the obstacle, the attitude or the trajectory of the aircraft can be significantly disturbed. To prevent such disturbance, for example, Patent Document 1 discloses a remotely piloted aircraft having a rotary frame.

CITATION LIST

Patent Literature

PTL 1: Japanese Patent No. 6224234-B1 (Japanese Unexamined Patent Application Publication No. 2016-523759)

SUMMARY OF INVENTION

Technical Problem

In the aircraft of Patent Document 1, since the center of gravity of the aircraft coincides with the center of the rotation axis of the outer frame, the moment of inertia is small. Accordingly, when the outer frame rotates, it is possible that the attitude of the aircraft is disturbed by torque arising at a connection between the outer frame and the aircraft body. Therefore, in a situation where the outer frame is likely to contact the external object and receive an external force during flight (for example, when the aircraft enters a confined area), the attitude of the aircraft is frequently disturbed. Images taken in such states are not suitable for inspection, due to image blur or the like.

An object of the present disclosure is to provide an aircraft, a flight system, and an inspection system capable of maintaining the attitude of the aircraft even when the outer frame of the aircraft comes into contact with an external object and receives an external force during flight.

Solution to Problem

An embodiment of the present disclosure provides an aircraft that includes a body and an outer frame rotatably coupled to the body. The body includes a plurality of rotary blades and a driver configured to rotate the plurality of rotary blades. The outer frame includes a rotary frame rotatable about a rotation axis intersecting the direction of gravity, and a center of gravity of the plurality of rotary blades and the driver is located lower than the rotation axis in the direction of gravity.

Another embodiment provides a flight system that includes the above-described aircraft and an operation device configured to operate the aircraft.

Yet another embodiment provides a structure inspection system that includes an aircraft, an operation device configured to operate the aircraft; and a terminal configured to communicate with at least one of the aircraft and the operation device. The aircraft includes the above-described body, the outer frame, and an image capturing device configured to acquire an image or a video of a target, disposed with a center of gravity thereof located above the rotation axis in the direction of gravity. The terminal is configured to generate a second image from a first image acquired with the image capturing device and output the second image in association with the first image.

Advantageous Effects of Invention

The present disclosure can provide an aircraft, a flight system, and an inspection system capable of maintaining the attitude of the aircraft even when the outer frame of the aircraft comes into contact with an external object and receives an external force during flight.

BRIEF DESCRIPTION OF DRAWINGS

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

Figure 1:
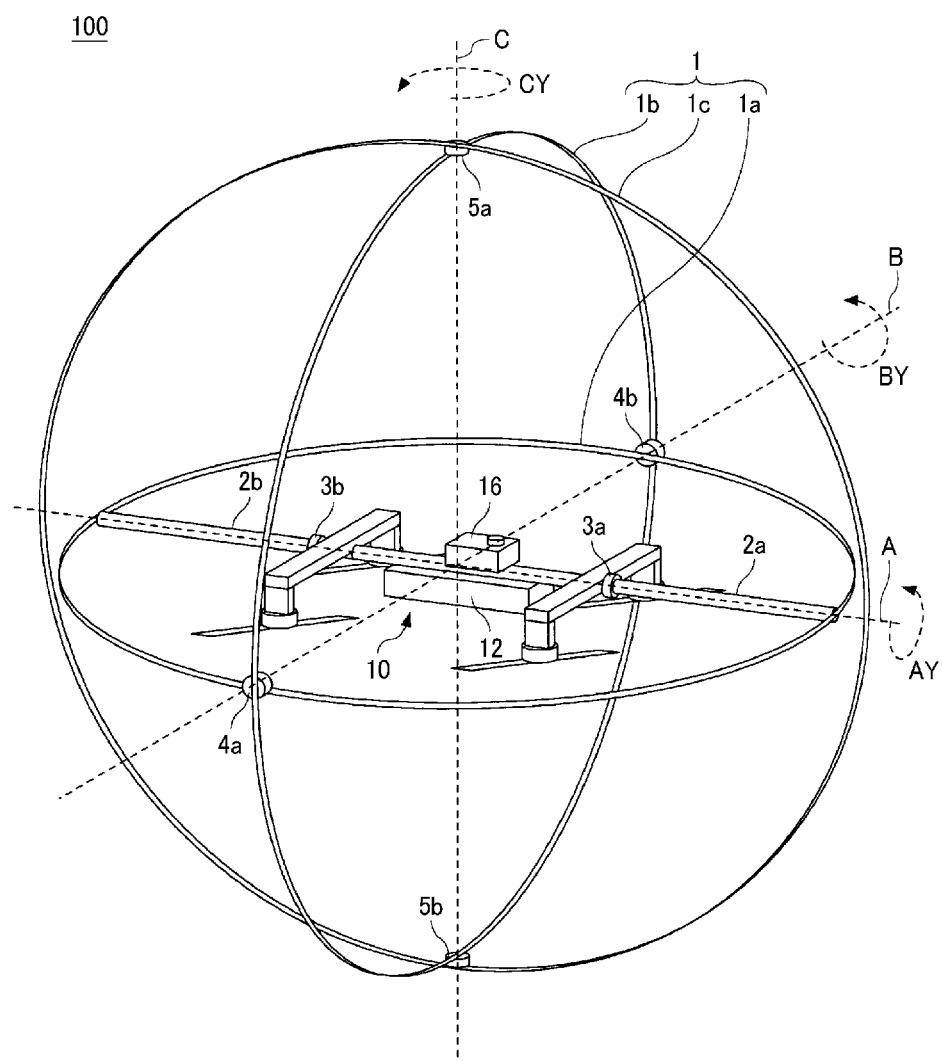
FIG. 1 is a perspective view schematically illustrating an example configuration of an aircraft according to Embodiment 1.

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

There are drawings in which the directions are indicated by an A axis, a B axis, and a C axis. As an example, the A axis is the rotation axis of pitching, the B axis is the rotation axis of rolling, and the C axis is the rotation axis of yawing.

Embodiment 1

First, a configuration of an aircraft according to Embodiment 1 will be described. FIG. 1 is a perspective view schematically illustrating an example configuration of an aircraft 100 (e.g., a drone). As illustrated in FIG. 1, the aircraft 100 includes an outer frame 1, support frames 2a and 2b, first joints 3a and 3b, second joints 4a and 4b, third joints 5a and 5b, and a multicopter 10. The outer frame 1 includes a first rotary frame 1a, a second rotary frame 1b, and a third rotary frame 1c.

The support frames 2a and 2b are secured to the first rotary frame 1a. The support frames 2a and 2b are coupled to the multicopter 10 via the first joints 3a and 3b, respectively. The first joints 3a and 3b are made of mechanical parts such as ball bearings or sliding bearings that are generally used and make the coupled parts rotatable consecutively. The same applies to the second joints 4a and 4b and the third joints 5a and 5b.

With the first joints 3a and 3b, the multicopter 10 is rotatable about the A axis with respect to the support frames 2a and 2b. Further, the first rotary frame 1a coupled to the support frames 2a and 2b is rotatable about the A axis with respect to the multicopter 10.

The second joints 4a and 4b are secured to the first rotary frame 1a. The second rotary frame 1b is coupled to the first rotary frame 1a via the second joints 4a and 4b. With the second joints 4a and 4b, the second rotary frame 1b is rotatable about the B axis with respect to the first rotary frame 1a. Further, the second rotary frame 1b is rotatable about the B axis with respect to the multicopter 10, which is coupled to the first rotary frame 1a via the support frames 2a and 2b and the first joints 3a and 3b.

The third joints 5a and 5b are secured to the second rotary frame 1b. The third rotary frame 1c is coupled to the second rotary frame 1b via the third joints 5a and 5b. With the third joints 5a and 5b, the third rotary frame 1c is rotatable about the C axis with respect to the second rotary frame 1b. Further, the third rotary frame 1c is rotatable about the C axis with respect to the multicopter 10, which is coupled to the second rotary frame 1b via the first rotary frame 1a, the support frames 2a and 2b, and the first joints 3a and 3b.

The outer frame 1 is constructed to as to include the three rotation axes of the A axis, the B axis, and the C axis, each intersecting with each other. Such a rotating mechanism of the outer frame 1 is a so-called gimbal mechanism or the like. The multicopter 10 disposed inside the outer frame 1 can rotate about the A axis as indicated by arrow AY, about the B axis as indicated by arrow BY, and about the C axis as indicated by arrow CY, independently of the outer frame 1. Note that although the outer frame 1 is made of the three annular parts but the structure of the outer frame 1 is not limited thereto. For example, the outer frame can be constructed of three spherical polyhedrons or the like. An example of the outer frame constructed of three spherical polyhedrons will be described in Embodiment 3.

Figure 2A:
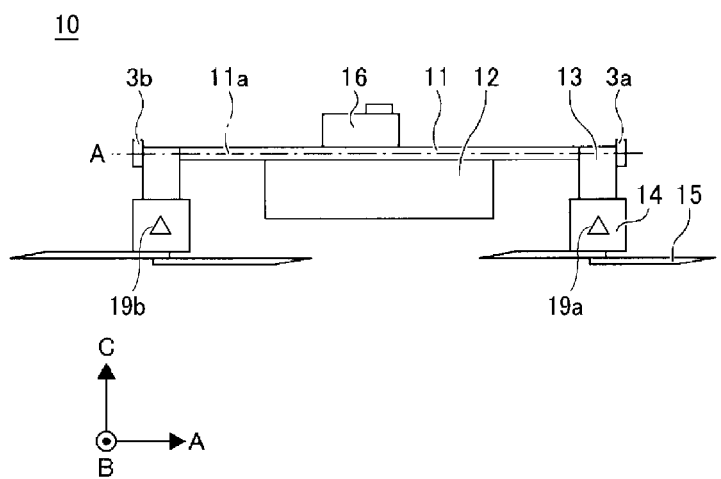
FIG. 2A is a side view illustrating an example configuration of a multicopter of the aircraft according to Embodiment 1.
Figure 2B:
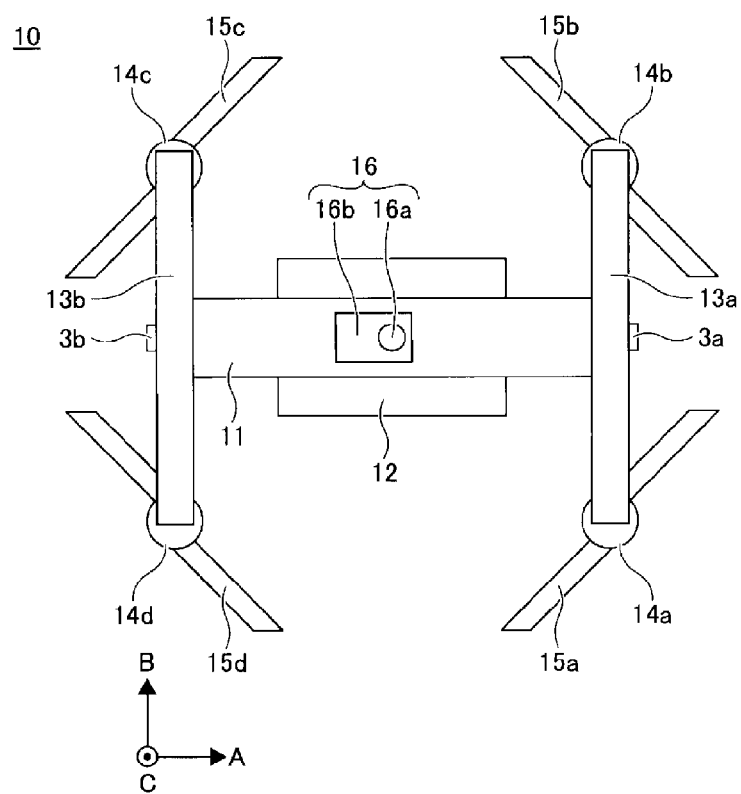
FIG. 2B is another side view illustrating an example configuration of the multicopter illustrated in FIG. 2A.

Next, the configuration of the multicopter 10 will be described. FIGS. 2A and 2B are side views illustrating an example configuration of the multicopter 10. FIG. 2A is a front view of the multicopter 10 as viewed along the B-axis direction, and FIG. 2B is a top view of the multicopter 10 as viewed along the C-axis direction.

As illustrated in FIGS. 2A and 2B, the multicopter 10 includes a frame 11, a control unit 12, a holder 13, motors 14a 14b, 14c, and 14d (also collectively "motors 14"), propellers 15a, 15b, 15c, and 15d (also collectively "propellers 15"), and a camera 16. The frame 11 holds the control unit 12 at a minus position in the C-axis direction relative to (lower in FIG. 2A than) the frame 11. In other words, the control unit 12 is positioned lower than the frame 11 (the A axis). Further, the frame 11 is coupled to the holder 13 (holding members 13a and 13b) at both ends in the A-axis direction, thereby securing the holders 13. Further, to the frame 11, the camera 16 is secured at a plus position in the C-axis direction relative to the frame 11. In other words, the camera 16 is positioned higher than the frame 11 (the A axis). In FIG. 2A, a centerline 11a of the frame 11 in the C-axis direction, indicated by a one-dot chain line, substantially coincides with the A axis.

As illustrated in FIG. 2B, the holder 13 includes the holding members 13a and 13b. The first joint 3a is attached to a face of the holding member 13a on the plus side (downstream side) in the A-axis direction. The first joint 3b is attached to the opposite face of the holding member 13b (on the minus side or upstream side) in the A-axis direction.

In FIG. 2B, each of the holding members 13a and 13b is a rectangle having the long side thereof extending in the B-axis direction, and both end portions in the B-axis direction are bent toward the minus side in the C-axis direction (vertically downward in FIG. 2A). Alternatively, the shapes of the holding members 13a and 13b illustrated in FIG. 2B may be formed by a combination of block-shaped members or the like. The holding members 13a and 13b are disposed at symmetrical positions in the A-axis direction across the control unit 12 and secured to the frame 11.

The motors 14 include the motors 14a to 14d. The motors 14a and 14b are disposed at symmetrical positions in the B-axis direction across the frame 11 and attached, respectively, to the bent end portions of the holding member 13a bent toward the minus side in the C-axis direction.

Similarly, the motors 14c and 14d are disposed at symmetrical positions in the B-axis direction across the frame 11 and attached, respectively, to the bent end portions of the holding member 13b bent toward the minus side in the C-axis direction.

The propellers 15a to 15d are coupled via mechanical parts such as couplings to respective motor shafts of the motors 14a to 14d. The motors 14a and 14b and the propellers 15a and 15b are located lower than the holding member 13a and the frame 11 (lower than the A axis) in the vertical direction. Further, the motors 14c and 14d and the propellers 15c and 15d are located lower than the holding member 13b and the frame 11 (lower than the A axis) in the vertical direction.

As illustrated in FIG. 2B, each of the propellers 15a to 15d includes two blades. The blades rotate, respectively, as the motors 14a to 14d rotate. Rotation of the blades generates thrust in the direction of the rotation axis. Each of the blades is gently twisted from a rotation shaft to the tip of the blade. However, the shape of the blade is not limited thereto, and the blade can be a flat plate. In the description below, the description "rotation of the propeller" is synonymous with "rotation of the blade".

FIG. 2A indicates a center of gravity 19a of the motors 14a and 14b and the propellers 15a and 15b, and a center of gravity 19b of the motors 14c and 14d and the propellers 15c and 15d.

The camera 16 includes an image forming optical system 16a and a camera body 16b including an imaging element. The camera 16 captures an image or a video. The term "image" is synonymous with "still image", and the term "video" is synonymous with "motion picture" and "animation". The image forming optical system 16a includes a plurality of lenses and forms an image of a target on an imaging surface of the imaging element. In FIG. 2A, the optical axis of the image forming optical system 16a is oriented to the plus side (downstream side) in the C-axis direction. For example, a metal oxide semiconductor (MOS) device, a complementary metal oxide semiconductor (CMOS) device, a charge-coupled device (CCD), or the like can be used as the imaging element.

The center of gravity of the camera 16 is located above the frame 11 (the A axis) in the direction of gravity. The camera 16 is an example of an "imaging device".

The control unit 12 includes a controller 200 and a power supply 205. The controller 200 is electrically connected to the motors 14a to 14d, respectively, and controls the rotation thereof. Further, the controller 200 is electrically connected to the camera 16 and controls imaging by the camera 16.

The power supply includes a storage battery. The storage battery 212 is, for example, a lithium ion battery. The storage battery 212 is electrically connected to the controller 200, the motors 14a to 14d, the camera 16 and the like and supplies electric power thereto for operation.

The multicopter 10 is an example of a "body" of an aircraft. The motor 14 is an example of a "driver", and the propeller 15 is an example of a "rotary blade".

The A axis is an example of "first rotation axis" and an example of "predetermined rotation axis". The B axis is an example of "second rotation axis", and the C axis is an example of "third rotation axis".

The first rotary frame 1a is an example of "first rotary frame", the second rotary frame 1b is an example of "second rotary frame", and the third rotary frame 1c is an example of "third rotary frame".

Figure 3:
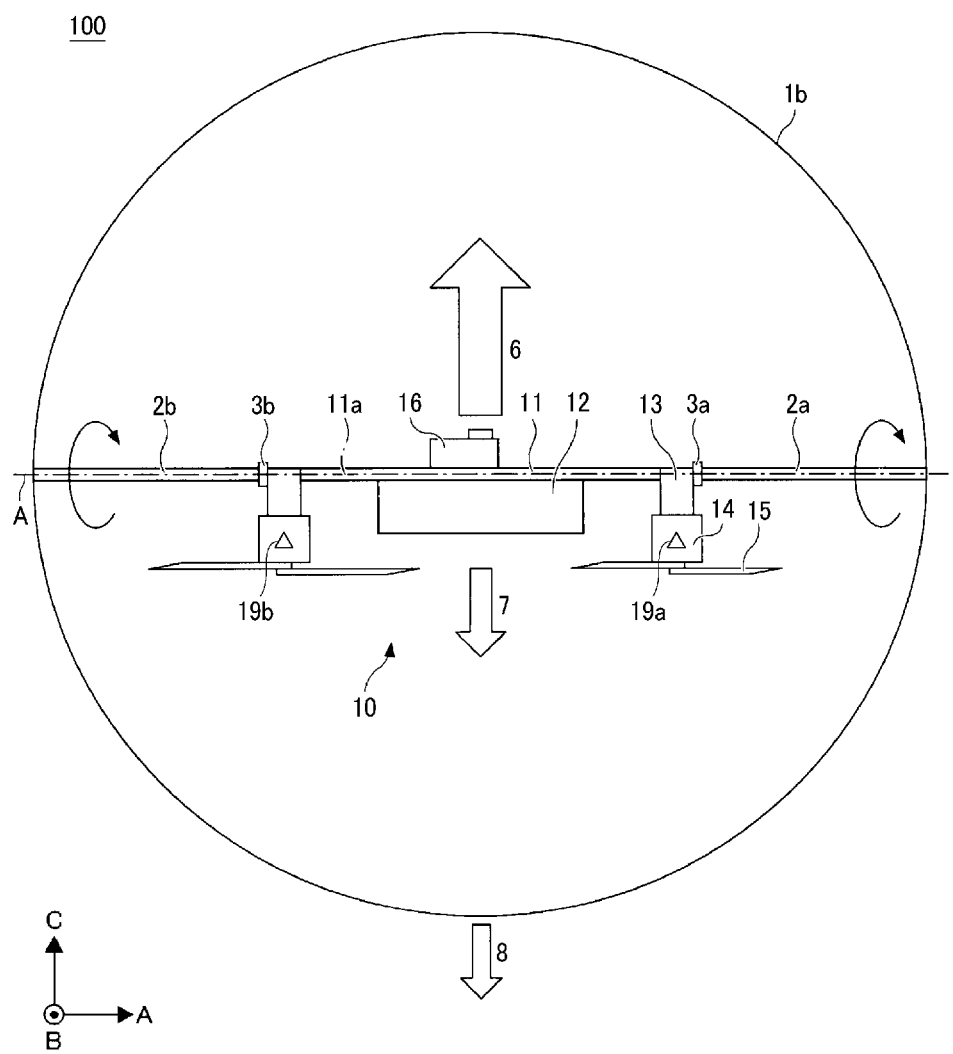
FIG. 3 is a front view of the aircraft according to Embodiment 1 as viewed along a B-axis direction.

Next, the force acting on the aircraft 100 will be described with reference to FIG. 3. FIG. 3 is a front view of the aircraft 100 as viewed along the B-axis direction.

In FIG. 3, arrow 6 (a hollow arrow) indicates a thrust acting on the aircraft 100. As described above, as the motors 14 in the multicopter 10 rotate, the propellers 15 rotate.

When the rotation speeds of the four motors 14a to 14d are set to be equal to each other, the four propellers 15a to 15d rotate at approximately the same rotation speed. As a result, the propellers 15a to 15d generate substantially equal thrusts and advance the multicopter 10 in the direction indicated by arrow 6.

On the other hand, hollow arrows 7 and 8 indicate the force of gravity acting on the multicopter 10. That is, hollow arrows 7 and 8 indicate the direction of gravity. When the mass of the multicopter 10 is M, the mass of the outer frame 1 is m, and the gravitational acceleration is g, the gravity acting on the multicopter 10 is expressed as "Mg" and the gravity acting on the outer frame 1 is expressed as "mg". The gravity acting on the aircraft 100 is the sum of the gravitational forces applied to the multicopter 10, the outer frame 1, and the like. Arrow 7 (a hollow arrow) indicates the gravity acting on the multicopter 10, and arrow 8 (a hollow arrow) indicates the gravity acting on the outer frame 1.

In the example illustrated in FIG. 3, the thrust in the direction indicated by arrow 6 acts in the direction opposite the direction of gravity, and the thrust in such a case is equivalent to a lift force. Therefore, when the lift force is greater than the sum of gravity applied to the aircraft 100, the multicopter 10 hovers.

However, reaction of the rotational force occurs as each propeller rotates. In order to cancel the reaction, adjacent propellers are rotated in opposite directions while the opposing propellers are rotated in the same direction. For example, the propeller 15a and the propeller 15c rotate clockwise. Meanwhile, the propeller 15b and the propeller 15d rotate counterclockwise. As a result, the reaction of the rotational force caused by the rotation of the propellers is canceled out, and the multicopter 10 can hover stably.

On the other hand, if the rotation speeds of the motors 14a to 14d are different from each other, the propellers 15a to 15d generate different thrusts. Due to the difference in thrust of each propeller, the multicopter 10 tilts in a desired direction while hovering. As a result, the multicopter 10 can travel, that is, fly, in the direction to which the multicopter 10 is inclined.

For example, in FIG. 2B, when the motors 14a and 14d are rotated at a higher rotation speed than the rotation speed of the motors 14b and 14c, the thrusts by the propellers 15a and 15d are larger than the thrusts by the propellers 15b and 15c. As a result, the multicopter 10 is tilted around the A axis and can travel, that is, fly, to the plus side in the B-axis direction.

Figure 4:
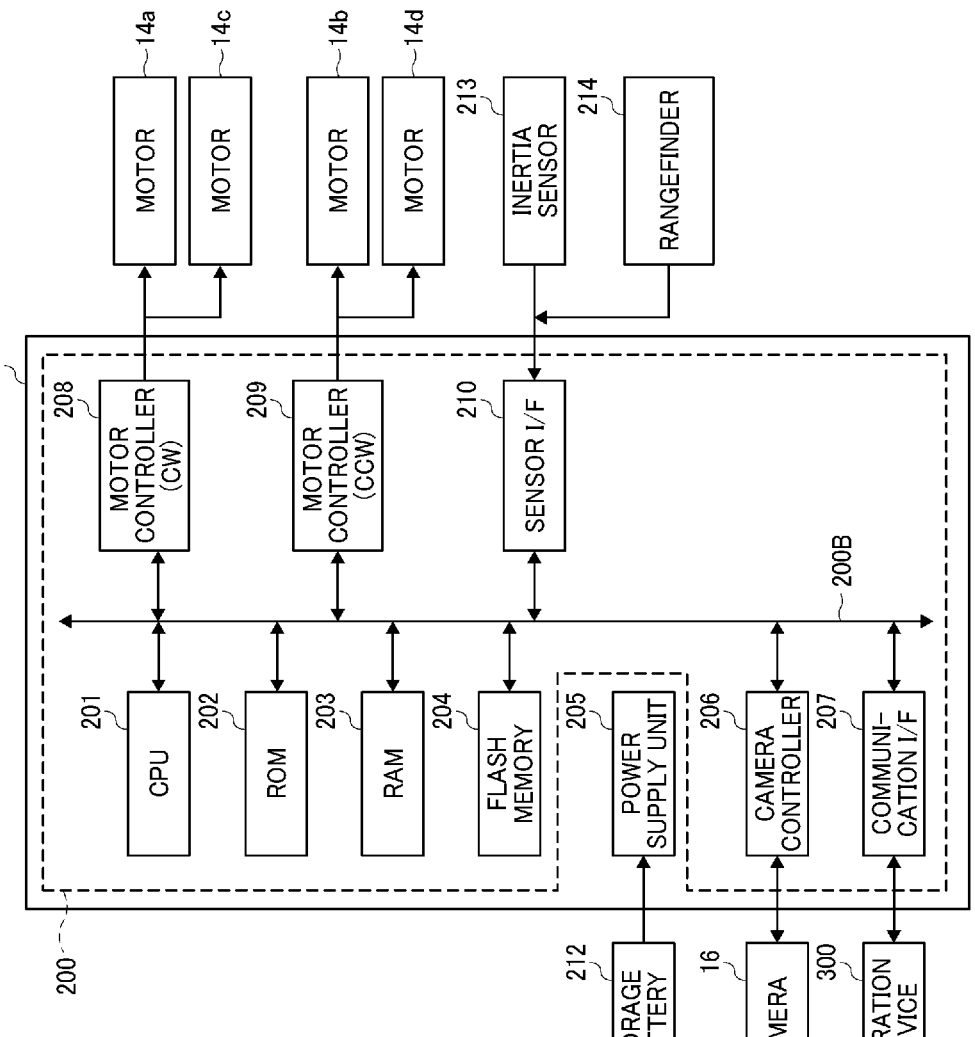
FIG. 4 is a block diagram illustrating an example hardware configuration of a controller system of the aircraft according to Embodiment 1.

A description is given of a hardware configuration of a control system of the aircraft according to the present embodiment. FIG. 4 is a block diagram illustrating an example hardware configuration of the control unit 12 of the aircraft 100 according to the present embodiment.

As illustrated in FIG. 4, the controller 200 of the control unit 12 includes a central processing unit (CPU) 201, a read only memory (ROM) 202, a random access memory (RAM) 203, a flash memory 204, a camera controller 206, and a communication interface (I/F) 207. Further, the controller 200 includes a clockwise (CW) motor controller 208, a counterclockwise (CCW) motor controller 209, and a sensor I/F 210. The above-described elements are connected with each other through a system bus 200B.

The CPU 201 controls entire operation of the controller 200. The CPU 201 loads programs stored in the ROM 202, the flash memory 204, or the like onto the RAM 203 as a work area, to execute the programs to control the entire operation of the controller 200 to implement the functions described later.

The flash memory 204 can store the programs executed by the CPU 201 and images or videos acquired by the camera 16.

The power supply unit 205 is connected to the storage battery 212 and supplies electric power from the storage battery 212 to the controller 200.

The camera controller 206 is an electric circuit that generates a control signal according to an instruction from the CPU 201 and outputs a voltage signal based on the control signal, thereby controlling capturing or imaging by the camera 16. In addition, the controller 200 can input the image or the video taken by the camera 16 via the camera controller 206.

The communication I/F 207 is an interface for connecting to an operation device 300 by radio communication. The controller 200 inputs, to the CPU 201, a remote control signal from the operation device 300 via the communication I/F 207 and outputs data, such as images taken by the camera 16, acquired by the controller 200, to the operation device 300.

The CW motor controller 208 is electrically connected to the motor 14a and the motor 14c. The CW motor controller 208 is an electric circuit that generates a control signal according to an instruction from the CPU 201 and outputs a voltage signal based on the control signal, thereby controlling the rotation of the motors 14a and 14c. Similarly, the CCW motor controller 209 is electrically connected to the motors 14b and 14d. The CCW motor controller 209 is an electric circuit that generates a control signal according to an instruction from the CPU 201 and outputs a voltage signal based on the control signal, thereby controlling the motors 14b and 14d.

The CW motor controller 208 outputs a clockwise signal and rotates the motors 14a and 14c clockwise. The CCW motor controller 209 outputs a counterclockwise signal and rotates the motors 14b and 14d counterclockwise.

The sensor I/F 210 is an interface to connect to an inertia sensor 213 and a rangefinder 214 mounted on the aircraft 100. The controller 200 inputs, via the sensor I/F 210 to the CPU 201, data of the aircraft 100 detected by the inertia sensor 213 and the rangefinder 214. The input data is used to control the flight of the aircraft 100 or control the inspection by the aircraft 100, and the like.

The inertia sensor 213 detects the angular speed and the acceleration, based on which the inertia sensor 213 detects the attitude or the motion state of the aircraft 100. The data detected by the inertia sensor 213 is used for flight control. Instead of the inertia sensor 213, an inertia measuring device including a triaxial accelerometer, a triaxial gyro sensor, and a triaxial magnetic sensor can be used. The rangefinder 214 measures the distance to a structure or the like to be inspected by the aircraft 100.

Note that some or all of the processing performed by the CPU 201 can be implemented by an electronic circuit such as a field-programmable gate array (FPGA) or an application specific integrated circuit (ASIC).

Further, the aircraft 100 can includes a lighting device for illuminating the inspection target, and the controller 200 can control the lighting by the lighting device. The aircraft 100 can further include, in addition to the inertial sensor and the rangefinder, a sensor for detecting another element.

The controller 200 can implement the functional configuration to be described below, with the instruction from the CPU 201 and the hardware configuration illustrated in FIG. 4.

Figure 5:
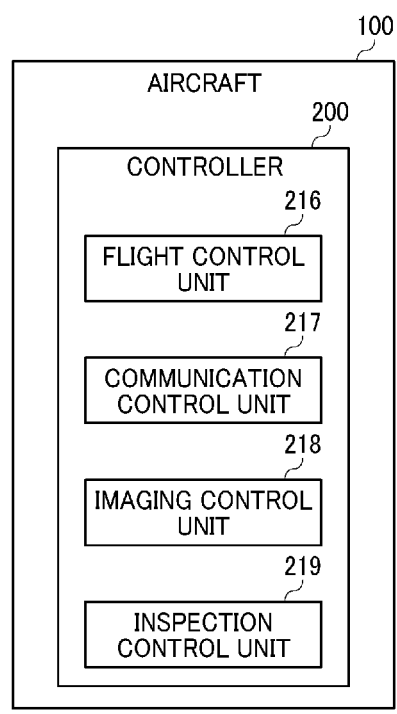
FIG. 5 is a block diagram illustrating an example functional configuration of the controller of the aircraft according to Embodiment 1.

FIG. 5 is a block diagram illustrating an example functional configuration of the controller 200 according to the present embodiment. The controller 200 includes a flight control unit 216, a communication control unit 217, an imaging control unit 218, and an inspection control unit 219.

The flight control unit 216 controls flight of the aircraft 100. For example, the flight control unit 216 controls, with one or both of the CW motor controller 208 and the CCW motor controller 209, the rotation of the motors 14a to 14d based on the remote control signal input from the operation device 300 or the attitude or the motion state of the aircraft 100 detected by the inertia sensor 213. As a result, the attitude, the motion state, and the like of the aircraft 100 are controlled. The flight control unit 216 is implemented by, for example, the CW motor controller 208, the CCW motor controller 209, and the CPU 201.

The communication control unit 217 communicates with the operation device 300 by wireless communication via the communication I/F 207. For example, the communication control unit 217 receives a remote control signal from the operation device 300 or transmits the image or the video taken by the camera 16 to the operation device 300. The communication control unit 217 is implemented by, for example, the communication I/F 207, the CPU 201, and the like.

The imaging control unit 218 controls imaging by the camera 16 according to instructions from the CPU 201. The imaging control unit 218 controls the shutter speed, the frame rate, and the like of the camera 16.

The inspection control unit 219 controls the operation of the aircraft 100 for inspection. The, inspection control unit 219 controls the attitude of the aircraft 100, the motion state of the aircraft 100, or the distance to the structure to be inspected at the time of inspection.

Next, the attitude of the multicopter 10 during the flight of the aircraft 100 will be described. When the aircraft 100 flies due to, one or both of, lift and thrust of the multicopter 10, the multicopter 10 supports the outer frame 1 via the first joints 3a and 3b. In this case, a load due to the weight of the outer frame 1 is applied to the first joints 3a and 3b. Sliding resistance occurs when the outer frame 1 rotates about the A-axis in response to the load, with respect to the multicopter 10.

The sliding resistance causes torque, that is, a moment around the A axis acting on the multicopter 10 when the outer frame 1 rotates about the A axis with respect to the multicopter 10 due to an external force upon contact between the outer frame 1 and a structure or the like. Such torque disturbs the attitude of the multicopter 10.

Figure 6:
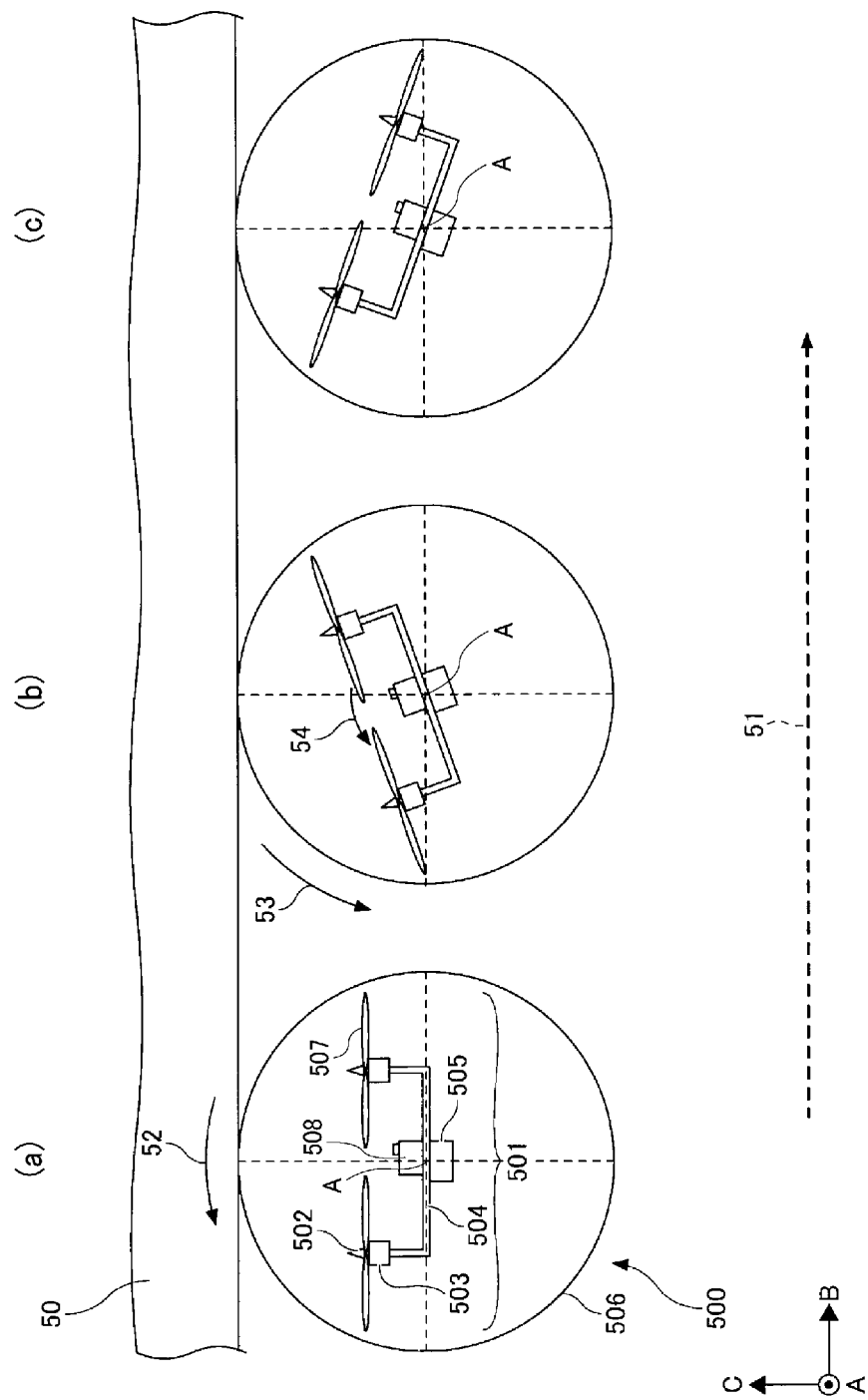
FIG. 6 illustrates changes in attitude of a multicopter when torque is applied to a comparative aircraft different from Embodiment 1.

FIG. 6 illustrates changes in attitude of the multicopter 10 when torque is applied to a comparative aircraft 500, different from the aircraft 100 according to the present embodiment.

FIG. 6 illustrates the aircraft 500 advancing in the direction indicated by broken arrow 51 while contacting a structure 50. In FIG. 6, (a) to (c) illustrate three states of the aircraft 500 being advancing.

Similar to the multicopter 10 according to the present embodiment, a multicopter 501 of the aircraft 500 includes propellers 502 and 507, motors 503, a holder 504, a control unit 505, and a camera 508. Unlike the multicopter 10 according to the present embodiment, in the multicopter 501, the propeller 502 and the motor 503 are disposed above the A axis, which is a rotation axis of an outer frame 506, in the direction of gravity.

In the state (a) illustrated in FIG. 6, no torque is applied to the aircraft 500. As the outer frame 506 contacts the structure 50 in the state (a) illustrated in FIG. 6, an external force in the direction indicated by arrow 52 is applied to the aircraft 500. In the state (b) illustrated in FIG. 6, the outer frame 506 is rotated, by the external force, in the direction indicated by arrow 53. That is, the outer frame 506 is rotating about the A axis.

At this time, torque in the direction indicated by arrow 54 is applied to the multicopter 501 due to the above-described sliding resistance. In accordance with the torque, the multicopter 501 is tilted. That is, the attitude of the multicopter 501 is changed. In the state (c) illustrated in FIG. 6, the multicopter 501 is tilted in the opposite direction due to the reaction of the tilting in the state (b) illustrated in FIG. 6.

In inspection in a confined area, the aircraft 500 takes pictures of or images the surface of the structure 50 while advancing with the outer frame contacting the structure. Accordingly, as illustrated in FIG. 6, an external force is constantly applied to the outer frame 506 of the aircraft 500. Therefore, the aircraft 500 tends to be in the state (b) or (c) of FIG. 6. If the attitude of the aircraft is disturbed in the state described above, it is possible that the image or video taken is blurred and is not suitable for inspection.

In the present embodiment, as illustrated in FIG. 2, the center of gravity of the motors 14a to 14d and the propellers 15a to 15d is positioned lower than the A axis in the direction of gravity. In the present embodiment, the motors 14a to 14d and the propellers 15a to 15d are disposed lower than the frame 11 (the A axis). As long as the center of gravity of the motors 14a to 14d and the propellers 15a to 15d is positioned lower than the frame 11, a portion of the motors 14a to 14d and the propellers 15a to 15d can be positioned above the frame 11.

The propellers and the motors for rotating the propellers are relatively heavy among the components of an aircraft. In particular, when the aircraft has a plurality of propellers and a plurality of motors, the weight of propellers and the motors is significantly heavy compared with other components.

Figure 7A:
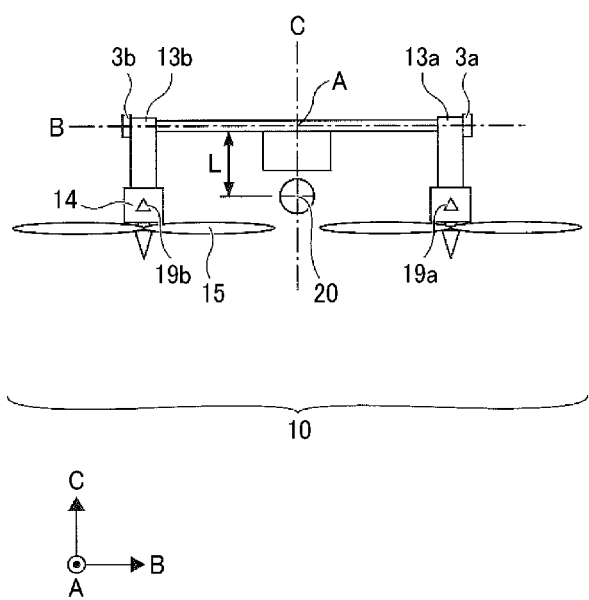
FIG. 7A is a view illustrating the relationship between the motion of the multicopter and the position of center of gravity when torque is applied to the multicopter in the aircraft according to Embodiment 1.
Figure 7B:
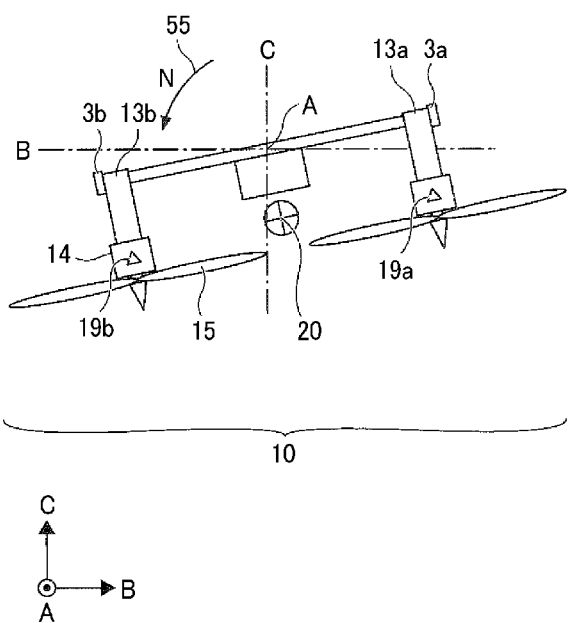
FIG. 7B is another view illustrating the relationship between the motion of the multicopter and the position of center of gravity when torque is applied to the multicopter illustrated in FIG. 7A.

Such an effect is described below with reference to FIGS. 7A and 7B. FIGS. 7A and 7B are diagrams for explaining the relationship between the movement of the multicopter 10 about the A axis and the gravitational center when the torque about the A axis is applied to the multicopter 10 according to the present embodiment.

In FIGS. 7A and 7B, the A axis is orthogonal to the B axis and the C axis at the intersection between the B axis and the C axis. The multicopter 10 has a center of gravity 20 in FIGS. 7A and 7B. In FIG. 7A, no torque is applied to the multicopter 10. In FIG. 7A, the center of gravity 20 is at a distance L from the A axis. In the state illustrated in FIG. 7B, torque N is applied to the multicopter 10 in the direction indicated by arrow 55. With the torque N, the multicopter 10 is rotating about the A axis.

When "I" represents the moment of inertia about the A axis of the multicopter 10, Equation 1 below represents an angular acceleration α occurring in the multicopter 10 due to the torque N.

$$\alpha = N/I \qquad \text{Equation 1}$$

As can be known from Equation 1, as the moment of inertia I increases, the angular acceleration α occurring in the multicopter 10 decreases, and the change in the attitude of the multicopter 10 decreases.

By contrast, when "m" represents the mass of the multicopter 10, the moment of inertia I around the A axis of the multicopter 10 is expressed by Equation 2 below.

$$I = m \times L^2 \qquad \text{Equation 2}$$

As can be known from Equation 2, the moment of inertia I increases as the distance L increases.

As described above, when the gravitational center of the multicopter 10 is lower than the A axis in the direction of gravity, the angular acceleration α generated in the multicopter 10 due to the torque decreases. Accordingly, changes in the attitude of the multicopter 10 are restricted.

Therefore, in the present embodiment, the center of gravity 19a of the motors 14a and 14b and the propellers 15a and 15b and the center of gravity 19b of the motors 14c and 14d and the propellers 15c and 15d are disposed lower than the A axis in the direction of gravity. Accordingly, the gravitational center of the multicopter 10 is lowered, thereby minimizing changes in the attitude of the multicopter 10 at the occurrence of torque. In other words, the present embodiment provides an aircraft in which the attitude of the multicopter is not disturbed even in a situation where the outer frame frequently receives an external force due to contact with an external structure during the flight.

If the center of gravity 20 of the multicopter 10 is positioned lower than the A axis in the direction of gravity, the potential energy is the minimum when the multicopter 10 is horizontal. Therefore, the multicopter 10 is easily made horizontal by the action of gravity. The center of gravity 20 is defined as being lower than the A axis as long as the multicopter 10 settles in the attitude for flight after the multicopter 10 to which the outer frame 1 is attached is swayed.

Figure 8:
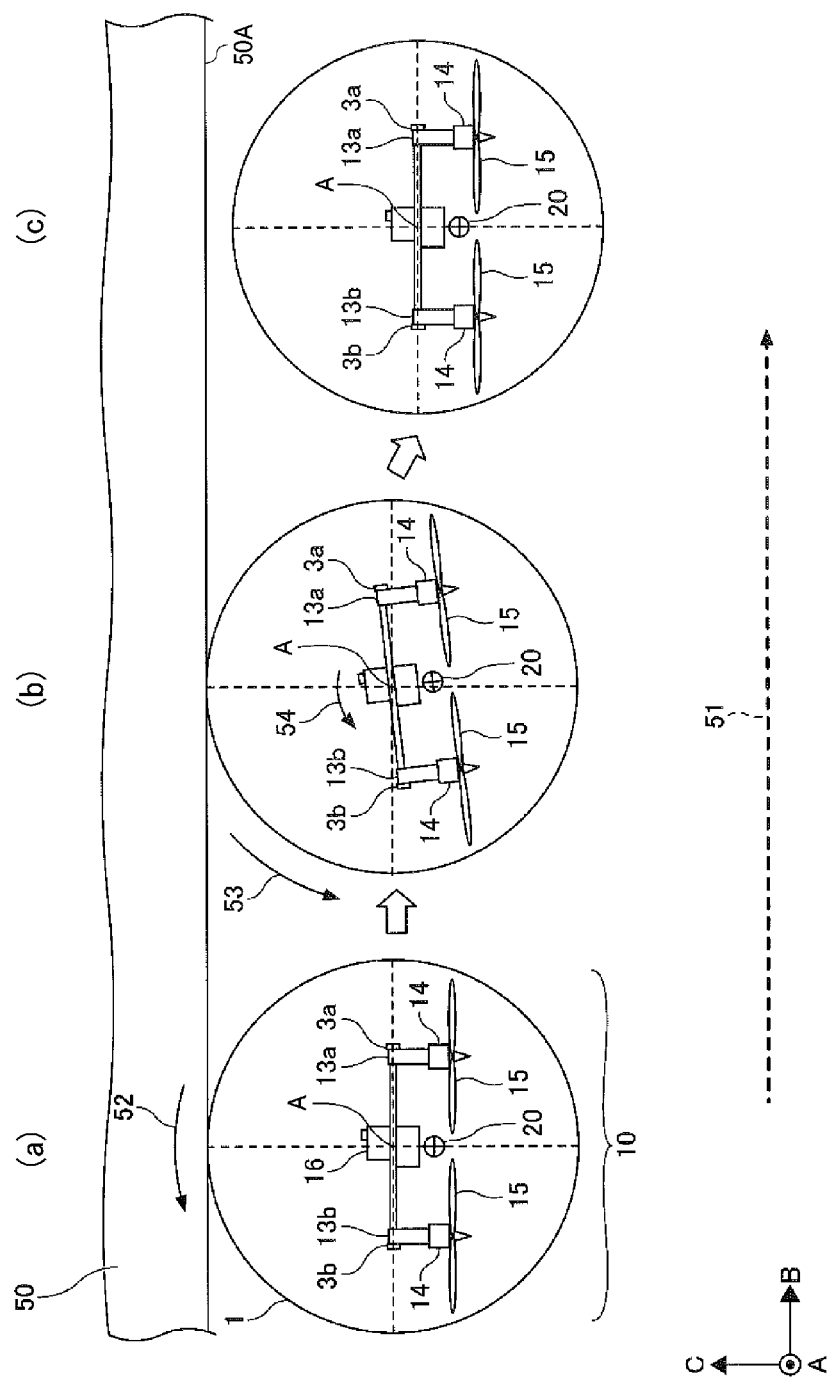
FIG. 8 illustrates changes in the attitude of the multicopter when torque is applied to the aircraft according to Embodiment 1.

FIG. 8 illustrates changes in the attitude of the multicopter 10 when torque is applied to the aircraft 100 according to the present embodiment.

Similar to FIG. 6, FIG. 8 illustrates a state in which the aircraft 100 advances in the direction indicated by broken arrow 51 while contacting the structure 50. In FIG. 8, (a) to (c) illustrate three states of the aircraft 100 advancing.

Compared with FIG. 6, the rotation of the multicopter 10 in the state (b) of FIG. 8 is small. Further, since becoming horizontal is easy, the multicopter 10 returns quickly to the horizontal state (c) as illustrated in FIG. 8 even when the multicopter 10 rotates.

A description is given below of inspection performed while the aircraft 100 is navigated to move in the direction indicated by arrow 51 as illustrated in FIG. 8. Specifically, the camera 16 is oriented to capture a face of a structure facing down (e.g., facing down vertically), and the camera 16 captures the structure 50 for inspection. In this case, preferably, imaging is performed in such a state that the outer frame 1 contacts the surface of the structure 50 with the multicopter 10 kept horizontal and the aircraft 100 advances with the outer frame 1 rolling. In this state, the multicopter 10 and the camera 16 can be close to the structure 50 during the imaging. Accordingly, a blind spot can be reduced, and a high resolution image can be acquired.

According to the present embodiment, rotation of the multicopter 10 by an external force acting on the outer frame 1 can be minimized. Even if the multicopter 10 rotates, the amount of change of the attitude thereof is small and the multicopter 10 can promptly right itself. Accordingly, the above-described imaging for inspection is facilitated. The face 50A of the structure 50, which faces down, is an example of a downward face of the structure.

In the present embodiment, the motors 14a and 14b and the propellers 15a and 15b are disposed lower than the frame 11 (the A axis) in the direction of gravity, and the motors 14c and 14d and the propellers 15c and 15d are disposed lower than the frame 11 (the A axis) in the direction of gravity. Such a configuration can lower the center of gravity of the multicopter 10 and restrict the rotation of the multicopter 10 due to an external force to the outer frame 1, similar to the configuration described above. Even when the multicopter 10 rotates, changes in the attitude can be smaller, and the multicopter 10 can promptly right itself. Accordingly, the imaging for inspection described above can be facilitated.

Furthermore, according to the present embodiment, the center of gravity of the propellers 15a to 15d is disposed lower than the A axis in the direction of gravity, and the center of gravity of the camera 16 is disposed above the A axis. Such a placement is advantageous in securing the field of view of the camera 16, without being hindered by the propellers 15a to 15d.

Such a configuration is preferable, in particular, when imaging the face 50A (facing down) of the structure 50 with the camera 16 as illustrated in FIG. 8 because the field of view of the camera 16 can be secured without being hindered by the propellers 15a to 15d.

Embodiment 2

Next, an aircraft according to Embodiment 2 is described. Elements similar to those of Embodiment 1 described above are given identical reference numerals, and descriptions thereof may be omitted.

Figure 9:
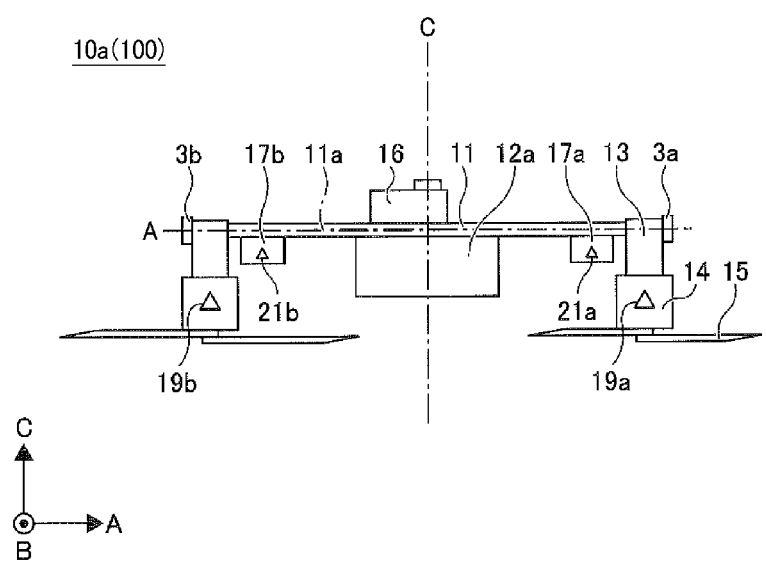
FIG. 9 is a side view illustrating an example configuration of a multicopter of an aircraft according to Embodiment 2.

In the present embodiment, the power supply unit is connected to a plurality of storage batteries. Further, the center of gravity of each storage battery is positioned lower than the A axis in the direction of gravity and not on the C axis. FIG. 9 illustrates an example configuration of a multicopter 10a of the aircraft 100 according to the present embodiment.

In FIG. 9, the multicopter 10a includes a control unit 12a and storage batteries 17a and 17b. Differently from the control unit 12 according to Embodiment 1, the control unit 12a includes the controller 200 but does not include a power supply unit.

The storage batteries 17a and 17b together function as a power supply unit. A center of gravity 21a of the storage battery 17a and a center of gravity 21b of the storage battery 17b are positioned lower than the A axis in the direction of gravity and deviated from the C axis. The expression "being deviated from the C axis" means that the center of gravity 21a of the storage battery 17a and the center of gravity 21b of the storage battery 17b are at different positions from the C axis in the direction of gravity.

The storage battery is relatively heavy among the components. In particular, when the aircraft includes a plurality of storage batteries, the weight of the storage batteries is significant compared with other components. In the present embodiment, the center of gravity of each of the storage batteries 17a and 17b is positioned lower than the A axis in the direction of gravity, thereby better restricting the change in the attitude of the multicopter 10.

Further, as the center of gravity of each of the storage batteries 17a and 17b is disposed away from the C axis, the moment of inertia with respect to the rotation about the C axis, that is, the yawing, is increased. Such a configuration can further restrict the change in the attitude of the multicopter 10 relative to the rotation of the outer frame 1. The storage batteries 17a and 17b are examples of "a plurality of storage batteries", and the C axis is an example of "third rotation axis".

The effects other than those described above are the same as those described in Embodiment 1.

Embodiment 3

Next, an aircraft according to Embodiment 3 is described. Elements similar to those of the above-described Embodiments 1 and 2 are given identical reference numerals, and descriptions thereof may be omitted.

In the present embodiment, the outer frame of the aircraft includes at least one of a geodesic dome structure and a fullerene structure.

A geodesic dome structure is a regular dodecahedron, which is a regular polyhedron close to a sphere, a regular icosahedron, or a truncated icosahedron of a semi-regular polyhedron is subdivided with a triangle close to an equilateral triangle while maintaining as much symmetry as possible, and the spherical surface is constructed by geodesics or groups of line segments each approximating a geodesic line. The geodesic dome structure is, in particular, a dome structure assembled with many homogeneous structural materials arranged side by side, mentioned above.

A fullerene structure is a dome structure of a truncated icosahedron constructed of 20 faces of pentagonal faces and hexagonal faces. The fullerene structure is shaped like a so-called soccer ball. The fullerene structure is, in particular, a dome structure assembled with many homogeneous structural materials arranged side by side, mentioned above.

Figure 10A:
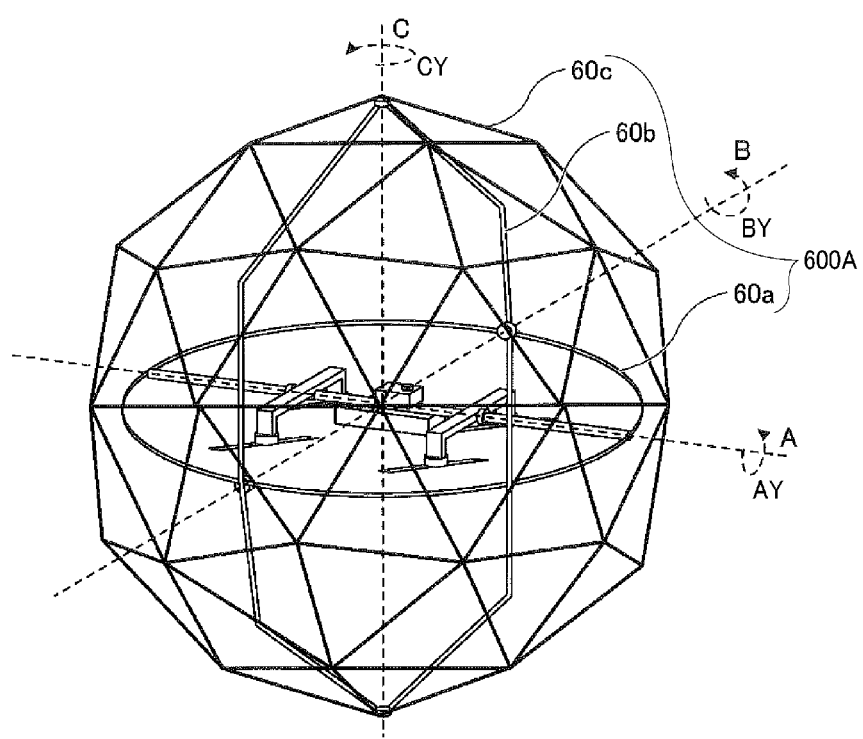
FIG. 10A is a view of an example of a geodesic dome structure in an aircraft according to Embodiment 3.

FIG. 10A illustrates an example geodesic dome structure. An outer frame 600A illustrated in FIG. 10A includes three outer frames rotatable, respectively, about A axis, B axis, and C axis orthogonal to each other and includes an outer frame of geodesic dome structure. A first rotary frame 60c has a geodesic dome structure that rotates about the C axis. A second rotary frame 60b that rotates about the B axis is disposed inside the first rotary frame 60c. A third rotary frame 60a that rotates about the A axis is disposed inside the second rotary frame 60b. Inside the third rotary frame 60a, the multicopter 10 is disposed. The multicopter 10 can rotate about the A axis, the B axis, and the C axis independently of the first rotary frame 60c, the second rotary frame 60b, and the third rotary frame 60a.

Figure 10B:
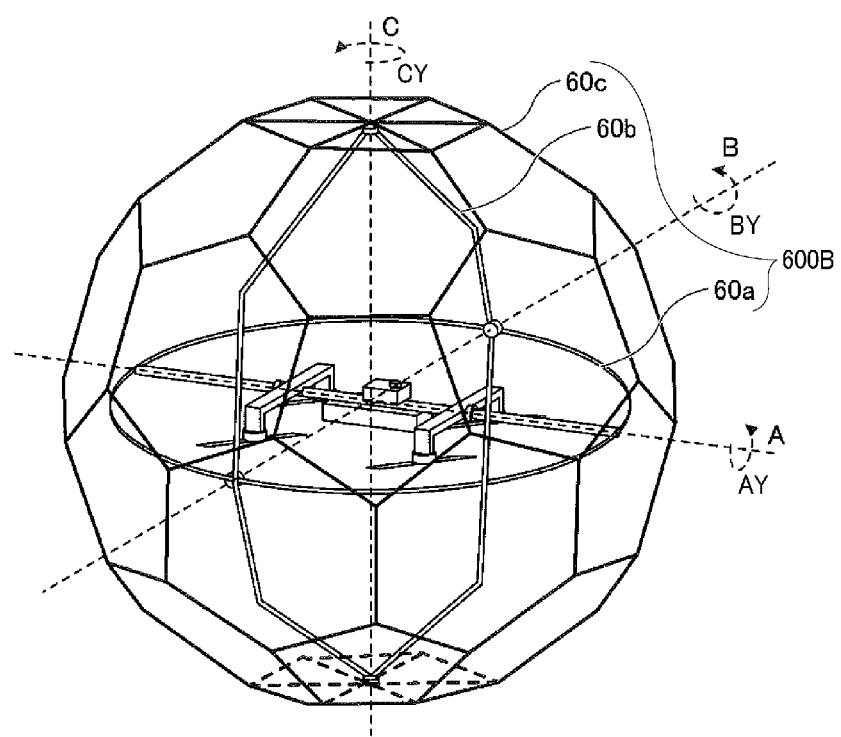
FIG. 10B is a view of an example of a fullerene structure in an aircraft according to Embodiment 3.

FIG. 10B illustrates an example fullerene structure. Similar to the structure illustrated in FIG. 10A, an outer frame 600B illustrated in FIG. 10B includes three outer frames respectively rotatable about the A axis, the B axis, and the C axis orthogonal to each other. The structure illustrated in FIG. 10B includes an outer frame of fullerene structure. The first rotary frame 60c has a fullerene structure that rotates about the C axis. A second rotary frame 60b that rotates about the B axis is disposed inside the first rotary frame 60c. A third rotary frame 60a that rotates about the A axis is disposed inside the second rotary frame 60b. Inside the third rotary frame 60a, the multicopter 10 is disposed. The multicopter 10 can rotate about the A axis, the B axis, and the C axis independently of the first rotary frame 60c, the second rotary frame 60b, and the third rotary frame 60a.

The present embodiment is advantageous in more smoothly rolling the outer frame 600A or 600B in FIG. 8, when imaging is performed in a state where the outer frame 600A or 600B contacts the face 50A of the structure 50 and rolls with the multicopter 10 kept horizontal. Such a configuration can further reduce the external force applied to the outer frame and the restrict change in the attitude of the multicopter 10 relative to the rotation of the outer frame 600A or 600B. Further, according to the fullerene structure, since the number of frames can be reduced compared with the geodesic dome structure, the frame is less likely to enter the image taken by the camera 16, and the weight of the aircraft e can be reduced.

The effects other than those described above are the same as those described in Embodiments 1 to 2.

Embodiment 4

Next, Embodiment 4 is described. Elements similar to those of the above-described Embodiments 1 to 3 are given identical reference numerals, and descriptions thereof may be omitted.

The flight system according to the present embodiment includes the aircraft 100 and the operation device 300.

Figure 11:
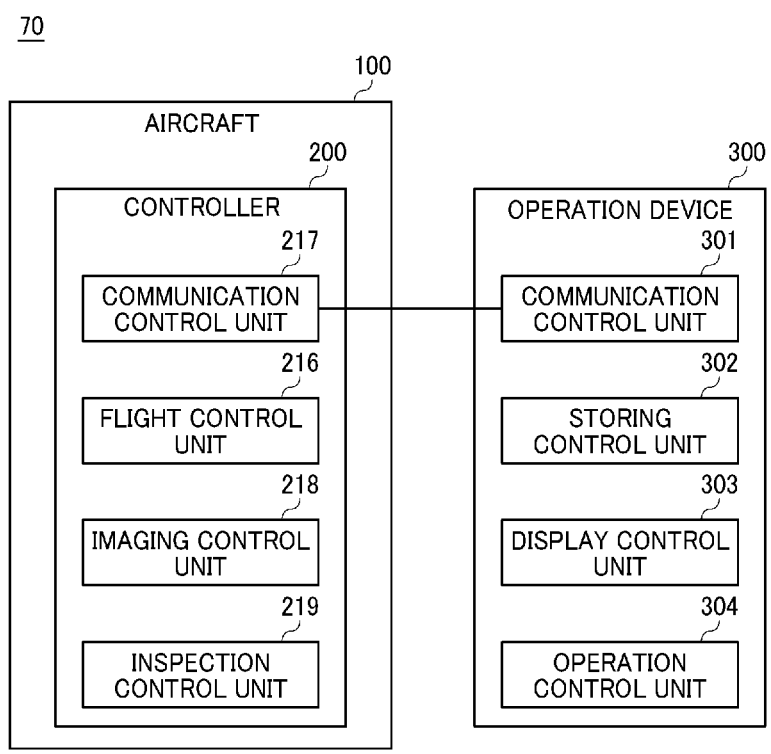
FIG. 11 is a block diagram illustrating an example functional configuration of a flight system according to Embodiment 4.

FIG. 11 is a block diagram illustrating an example functional configuration of a flight system 70 according to the present embodiment. The operation device 300 includes a communication control unit 301, a storing control unit 302, a display control unit 303, and an operation control unit 304.

The communication control unit 301 communicates, by wireless communication, with the controller 200 installed in the aircraft 100. For example, the communication control unit 301 receives, from the controller 200, the image or the video taken by the camera 16. Further, the communication control unit 301 transmits a remote operation signal for operating the aircraft 100 to the controller 200.

The storing control unit 302 stores, in a ROM, a flash memory, or the like, the image or the video received from the controller 200.

The display control unit 303 causes the display or the like of the operation device 300 to display the image or the video received from the controller 200.

The operation control unit 304 receives an input signal for operating the aircraft 100. The input for operating the aircraft 100 is, for example, an operation for navigating the aircraft 100, an operation for switching to an inspection mode, and the like.

The hardware of the operation device 300 includes, for example, a CPU, a ROM, and a RAM. Specifically, the operation device 300 operates according to a program preliminarily stored in the ROM, using the RAM as a work memory, to perform the above-described control operation.

Embodiment 5

Next, an inspection system according to Embodiment 5 is described. Elements similar to those of the above-described Embodiments 1 to 4 are given identical reference numerals, and descriptions thereof may be omitted.

Figure 12:
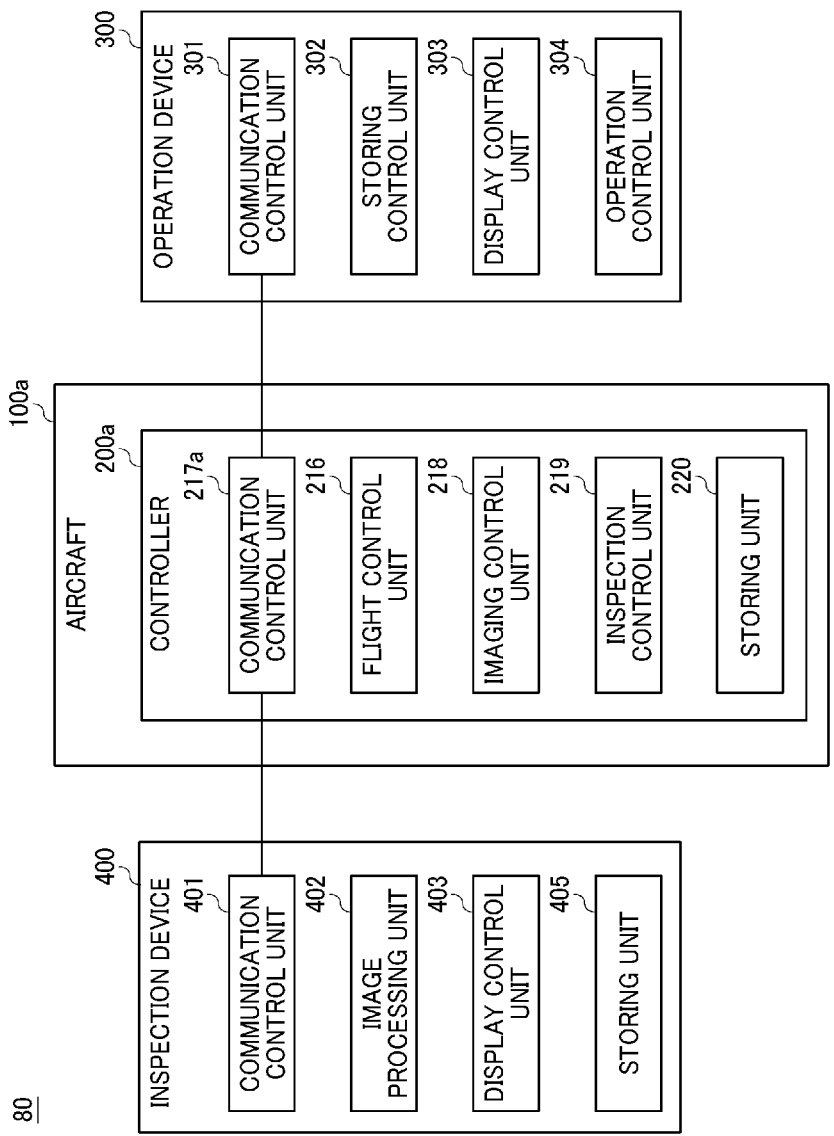
FIG. 12 is a block diagram illustrating an example functional configuration of a flight system according to Embodiment 5.

FIG. 12 is a block diagram illustrating an example functional configuration of an inspection system according to the present embodiment. FIG. 12 is a block diagram illustrating an example functional configuration of an inspection system 80 according to Embodiment 5. The inspection system 80 includes an aircraft 100a, the operation device 300, and an inspection device 400. The inspection system 80 is an example of "a structure inspection system".

The aircraft 100a includes a controller 200a. The controller 200a includes a communication control unit 217a and a storing unit 220.

Figure 13:
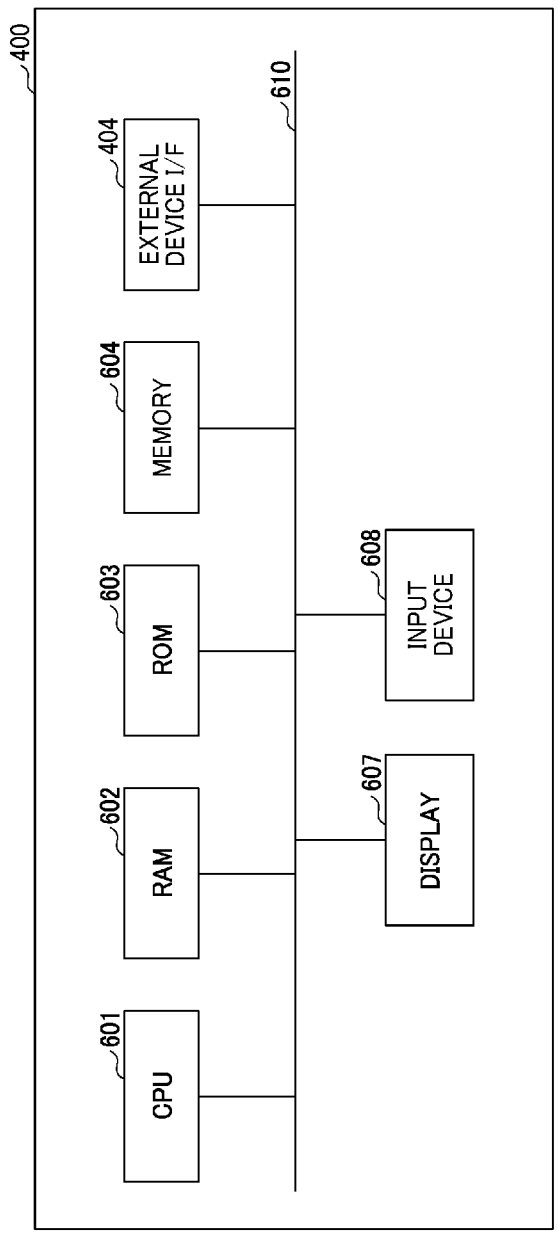
FIG. 13 is a block diagram illustrating an example hardware configuration of the inspection device illustrated in FIG. 12.

The communication control unit 217a communicates with the communication control unit 301 of the operation device 300 by wireless communication. The communication control unit 217a communicates with the communication control unit 401 of the inspection device 400 via the external device I/F 404 (see FIG. 13) by wireless communication. For example, the communication control unit 217a receives a remote operation signal for operating the aircraft 100a from the operation device 300. Further, the communication control unit 217a transmits the image or the video taken by the camera 16 to the inspection device 400.

The storing unit 220 stores the image taken by the camera 16. The storing unit 220 is implemented by a secure digital (SD) card or the like mounted on the aircraft 100a.

On the other hand, the inspection device 400 receives the image of the surface of the structure taken by the camera 16 of the aircraft 100a and performs processing for inspection. The inspection device 400 is, for example, a personal computer (PC) or the like installed in an office remote from the structure to be inspected.

The inspection device 400 includes a communication control unit 401, an image processing unit 402, a display control unit 403, and a storing unit 405. The inspection device 400 is an example of "terminal device configured to communicate with at least one of the aircraft and the operation device".

The communication control unit 401 receives, via the external device I/F 404, the image taken by the camera 16 from the communication control unit 217a of the aircraft 100a. The image processing unit 402 executes image processing for inspection or the like on the received image. The display control unit 403 displays the image processed by the image processing unit 402 on the display 607 (see FIG. 13). The external device I/F 404 is connected to an external memory such as a universal serial bus (USB) memory. The inspection device 400 is capable of inputting and outputting data to and from an external device such as a storage device via the external device I/F 404.

While traveling in a horizontal direction, the aircraft 100a acquires a group of images of a portion of the face facing vertically downward, such as a bottom face (back face) of a bridge deck (slab) or bottom face of a beam, taken by the camera 16. Continuous imaging, as in movie imaging, can attain a group of images overlapping with each other between adjacent frames.

The group of images thus acquired is transmitted to the inspection device 400 via the communication control unit 217a. The inspection device 400 receives the group of images via the communication control unit 401. The received group of images is input to the image processing unit 402.

The image processing unit 402 synthesize the group of images (example first images) in a unit for inspection, like coffers sectioned with cross girders (an example second image). The term "coffer" refers to a recessed panel, in the shape of a square, a rectangle, an octagon, or the like, that covers a ceiling or vault in architecture. Further, the image processing unit 402 processes the synthesized image to detect damage, determine the type of damage, and classify the degree of damage. The storing unit 405 stores results of such image processing in the memory 604 as inspection results. The inspection results are printed or taken out as an electronic file, to be treated as an inspection record. In such output (e.g., being printed or as taken out as an electronic file), the group of images and the image synthesized in the unit for inspection are associated with each other.

The description above concerns an example in which the image processing unit 402 performs determination of presence or absence of damage of a bridge, determination of type of the damage, and classification of degree of the damage. However, processing of the image processing unit 402 is not limited thereto. Alternatively, the inspection device 400 can be configured to display the group of images on the display 607 so that an inspector can check, visually, the group of images for determination of presence or absence of damage to a bridge, determination of type of the damage, and classification of degree of the damage. In this case, for example, the inspector operates the inspection device 400 to simultaneously display the image synthesized previously in the unit for inspection, if necessary, and uses the synthesized image for grasping the position in the image being inspected. The display 607 is, for example, a monitor of a PC or the like. The inspector can create an electronic file of the inspection result on a PC or the like, according to a required form, and treats the electronic file as an inspection record.

The storing unit 405 or 220 can be provided in one or more of the controller 200a, the operation device 300, and the inspection device 400. Similarly, the image processing unit 402 can be provided in one or more of the controller 200a, the operation device 300, and the inspection device 400.

The image acquired by the aircraft 100a can be transmitted to the inspection device 400 via the operation device 300.

Including the storing unit 220 and the image processing unit 402 in the controller 200a is advantageous in that, for example, the controller 200a can process (e.g., for image quality adjustment) the image and transmit the processed image to the inspection device 400. Including the storing unit 405 and the image processing unit 402 in the inspection device 400 is advantageous in that the controller 200a simply transmits the acquired image to the inspection device 400 such as a remote PC, and load-imposing processing, such as image processing, can be performed on the PC or the like.

With such an inspection system, a person can inspect an inspection target, without approaching a less accessible portion, such as the bottom face of the bridge, of the inspection target.

Since what the aircraft 100a does is only imaging, the skill required for the person at the imaging site is navigating the aircraft 100a. There is no need for qualified persons (inspectors) such as concrete diagnostic experts having advanced knowledge be on site during imaging.

The image acquired is sent to a PC or the like in another site, such as an office, remote from the imaging site, and the inspector can view the acquired image and the processed image for inspection, at the remote site. Since the inspector can inspect a plurality of bridges without actually visiting the sites, inspection efficiency can improve.

The operation device 300 can be configured to display the state of the aircraft 100a for the navigator. This is preferable because the state of the aircraft 100a can be checked when the navigator is not in a place to visually check whether or not the aircraft is stably flying. Further, the acquired image cam be displayed on the operation device 300.

The aircraft, the flight system, and the structure inspection system according to the embodiments described above are illustrative and do not limit the present invention. Thus, numerous additional modifications and variations are possible in light of the above teachings. For example, elements and/or features of different illustrative embodiments may be combined with each other and/or substituted for each other within the scope of the present invention.

Although the correspondence between the pitch, the roll, and the yaw with the A axis, the B axis, and the C axis are mentioned at the beginning of the description of embodiments, the correspondence is not limited thereto. For example, the A axis can be the rotation axis of the roll, the B axis can be the rotation axis of the pitch, the C axis can be the rotation axis of the yaw, and the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on and claims priority pursuant to 35 U.S.C. § 119(a) to Japanese Patent Application Nos. 2018-018575, filed on Feb. 5, 2018, and 2018-235437, filed on Dec. 17, 2018 in the Japan Patent Office, the entire disclosure of which is hereby incorporated by reference herein.

REFERENCE SIGNS LIST

1, 60 Outer frame
1a, 60c First rotary frame (Example of a first rotary frame)
1b, 60b Second rotary frame
1c, 60a Third rotary frame
2a, 2b Support frame
3a, 3b First connection joint
4a, 4b Second connection joint
5a, 5b Third connection joint
6, 7, 8, 51, 52, 53, 54, 55 Arrow
10, 10b Multicopter (an example of an aircraft body)
11 Frame
12 Control unit
13, 13a, 13b Holding member
14, 14a, 14b, 14c, 14d Motor (an example of rotary blade driver)
15, 15a, 15b, 15c, 15d Propeller (an example of rotary blades)
16 Camera (an example of imaging device)
16a Image forming optical system
16b Camera body
17a, 17b, 212 Storage battery
19a Center of gravity of the motors 14a to 14b and the propellers 15a to 15b
19b Center of gravity of the motors 14c to 14d and the propellers 15c to 15d
20 Center of gravity of multicopter
21a Center of gravity of storage battery 17a
21b Center of gravity of storage battery 17b
50 Structure
70 Flight system
80 Inspection system (an example of structure inspection system)
100, 100a Aircraft
200, 200a Controller
205 Power supply unit
213 Inertial sensor
214 Rangefinder
216 Flight control unit
217, 217a Communication control unit
218 Imaging control unit
219 Inspection control unit
220, 405 Storing unit
300 Operation device
301 Communication control unit
302 Storing control unit
303 Display control unit
304 Operation control unit 400 Inspection device (an example of terminal)
401 Communication control unit
402 Image processing unit
403 Display control unit
404 External device I/F
A Rotation axis of pitch (an example of first rotation axis)
B Rotational axis of roll (an example of second rotational axis)
C Rotational axis of yaw (an example of third rotational axis)

The invention claimed is:

1. An aircraft comprising:
a body including:
  a plurality of rotary blades; and
  a driver to rotate the plurality of rotary blades;
an outer frame rotatably coupled to the body; and
a storage battery to supply power to the driver,
wherein the outer frame includes a rotary frame rotatable about a rotation axis intersecting a direction of gravity,
wherein a center of gravity of the plurality of rotary blades and the driver is located lower than the rotation axis in the direction of gravity, and
wherein a center of gravity of the storage battery is located lower than the rotation axis in the direction of gravity.

2. The aircraft according to claim 1,
wherein the plurality of rotary blades and the driver are located lower than the rotation axis in the direction of gravity.

3. The aircraft according to claim 1,
wherein the body includes an image capturer to acquire at least one of an image and a video of a target, and
wherein a center of gravity of the image capturer is located above the rotation axis in the direction of gravity.

4. The aircraft according to claim 1, wherein the outer frame includes at least one of a geodesic dome structure and a fullerene structure.

5. An aircraft comprising:
a body including:
  a plurality of rotary blades; and
  a driver to rotate the plurality of rotary blades; and
an outer frame rotatably coupled to the body,
wherein the outer frame includes a rotary frame rotatable about a rotation axis intersecting a direction of gravity,
wherein a center of gravity of the plurality of rotary blades and the driver is located lower than the rotation axis in the direction of gravity,
wherein the body includes an image capturer to acquire at least one of an image and a video of a target,
wherein a center of gravity of the image capturer is located above the rotation axis in the direction of gravity, and
wherein the image capturer is oriented to capture a downward face of a structure being the target.

6. The aircraft according to claim 5,
wherein the plurality of rotary blades and the driver are located lower than the rotation axis in the direction of gravity.

7. The aircraft according to claim 5,
wherein the outer frame includes at least one of a geodesic dome structure and a fullerene structure.

8. An aircraft comprising:
a body including:
  a plurality of rotary blades; and
  a driver to rotate the plurality of rotary blades; and
an outer frame rotatably coupled to the body,
wherein the outer frame includes a rotary frame rotatable about a rotation axis intersecting a direction of gravity,
wherein a center of gravity of the plurality of rotary blades and the driver is located lower than the rotation axis in the direction of gravity,
wherein, where the rotation axis intersecting the direction of gravity is referred to as a first rotation axis and the rotary frame rotatable about the first rotation axis is referred to as a first rotary frame, the outer frame further includes a second rotary frame coupled to the first rotary frame, the second rotary frame rotates about a second rotation axis crossing the direction of gravity, the second rotation axis orthogonal to the first rotation axis, and
wherein a center of gravity of the plurality of rotary blades and the driver is located lower than the second rotation axis.

9. The aircraft according to claim 8, further comprising a plurality of storage batteries,
wherein the outer frame further includes a third rotary frame coupled to the second rotary frame, and the third rotary frame rotates about a third rotation axis being in the direction of gravity, and
wherein a center of gravity of each of the plurality of storage batteries is located lower than the first rotation axis and deviated from the third rotation axis in the direction of gravity.

10. The aircraft according to claim 8,
wherein the plurality of rotary blades and the driver are located lower than the rotation axis in the direction of gravity.

11. The aircraft according to claim 8,
wherein the body includes an image capturer to acquire at least one of an image and a video of a target, and
wherein a center of gravity of the image capturer is located above the rotation axis in the direction of gravity.

12. The aircraft according to claim 8,
wherein the outer frame includes at least one of a geodesic dome structure and a fullerene structure.

13. A flight system comprising:
the aircraft according to claim 1, and
an operation device to operate the aircraft.

14. A structure inspection system comprising:
an aircraft comprising:
  a body including:
    a plurality of rotary blades; and
    a driver to rotate the plurality of rotary blades; and
  an outer frame rotatably coupled to the body,
  wherein the outer frame includes a rotary frame rotatable about a rotation axis intersecting a direction of gravity,
  wherein a center of gravity of the plurality of rotary blades and the driver is located lower than the rotation axis in the direction of gravity,
  wherein the body includes an image capturer to acquire at least one of an image and a video of a target,
  wherein a center of gravity of the image capturer is located above the rotation axis in the direction of gravity;
an operation device to operate the aircraft; and
a terminal to communicate with at least one of the aircraft and the operation device,
wherein the terminal
  generates a second image from a first image acquired with the image capturer; and outputs the second image in association with the first image.

15. A flight system comprising:
the aircraft according to claim 5, and
an operation device to operate the aircraft.

16. A flight system comprising:
the aircraft according to claim 8, and
an operation device to operate the aircraft.

* * * * *